United States Patent [19]

Shirai et al.

[11] Patent Number: 5,333,944
[45] Date of Patent: Aug. 2, 1994

[54] ELECTRICALLY CONTROLLED VEHICLE BRAKE SYSTEM HAVING MEANS FOR CONTROLLING BRAKING BASED ON DETECTED ACTUAL BRAKING EFFECT AND DETERMINED TARGET VALUE

[75] Inventors: Kenji Shirai, Mishima; Sumio Katsuno, Gotenba, both of Japan

[73] Assignee: Toyota Jidosha Kabushiki Kaisha, Toyota, Japan

[21] Appl. No.: 923,493

[22] Filed: Aug. 3, 1992

[30] Foreign Application Priority Data

Aug. 6, 1991 [JP] Japan ................... 3-221061
Aug. 6, 1991 [JP] Japan ................... 3-221062

[51] Int. Cl.$^5$ .............................................. B60T 8/70
[52] U.S. Cl. ............................. 303/105; 303/100; 303/113.4; 303/116.2; 303/115.2; 364/426.02
[58] Field of Search ............... 303/113.4, 116.1, 116.2, 303/20, 10, 3, 15, 92, 94–99, 100–106, 115.2; 364/426.02; 188/358, 359, 151 A

[56] References Cited

U.S. PATENT DOCUMENTS

| | | | |
|---|---|---|---|
| 3,790,225 | 2/1974 | Wehde | 303/113.4 |
| 4,768,841 | 9/1988 | Watanabe | 303/113.4 |
| 4,812,777 | 3/1989 | Shrai | 303/100 |
| 5,040,852 | 8/1991 | Takata | 303/113.4 X |

FOREIGN PATENT DOCUMENTS

| | | |
|---|---|---|
| 0408844 | 1/1991 | European Pat. Off. . |
| 63-20256 | 1/1988 | Japan . |
| 63-242764 | 10/1988 | Japan . |
| 2080458 | 2/1982 | United Kingdom . |
| 2080459 | 2/1982 | United Kingdom . |

Primary Examiner—Robert J. Oberleitner
Assistant Examiner—Lee W. Young
Attorney, Agent, or Firm—Oliff & Berridge

[57] ABSTRACT

An electrically controlled brake system including a brake operating member, a first detector for detecting an operating amount of the brake operating member, a braking device braking a wheel of a vehicle, a second detector for detecting an actual braking effect provided by the braking device, and a controller for controlling the braking device. The second detector detects the actual braking effect in the form of a positive value when the vehicle is running in one of a forward and a backward direction, and in the form of a negative value when the vehicle is running in the other of the forward and backward directions. The controller determines a positive value as a target braking effect based on the detected operating amount of the brake operating member, and controls the braking device such that an absolute value of the detected actual braking effect coincides with the positive value of the determined target braking effect.

15 Claims, 8 Drawing Sheets

ELECTRICALLY CONTROLLED VEHICLE BRAKE SYSTEM HAVING MEANS FOR CONTROLLING BRAKING BASED ON DETECTED ACTUAL BRAKING EFFECT AND DETERMINED TARGET VALUE

BACKGROUND OF THE INVENTION

1. Field of the Invention

The present invention relates generally to an electrically controlled brake system for a vehicle, and more particularly to an arrangement capable of suitably controlling an amount of brake applied to a wheel of the vehicle, irrespective of whether the vehicle is running in the forward direction or in the backward direction, and/or irrespective of whether the vehicle is in a stop state or not.

1. Discussion of the Prior Art

As a device for decelerating or stopping a motor vehicle, there is known a hydraulically operated brake, in which a friction member is forced against a rotor rotating with a vehicle wheel, by a wheel brake cylinder which is activated by a pressurized fluid produced by a master cylinder when a brake pedal or other brake operating member is operated. In recent years, there has been proposed an electrically controlled brake system wherein the operating force or stroke or other operating amount of the brake operating member is electrically detected, so that the amount of brake applied to the wheel is controlled so as to provide a braking effect which corresponds to the detected operating amount of the brake operating member. For example, the braking effect is represented by a deceleration value of the vehicle. An example of such electrically controlled brake system is disclosed in JP-A 63-20256, wherein the hydraulic pressure in the wheel brake cylinder is controlled to provide a suitable deceleration value of the vehicle which is determined by the electrically detected operating amount of the brake operating member. Described more specifically, the brake system includes (a) a brake operating member, (b) first detecting means for detecting the operating amount of the brake operating member, (c) braking means for applying a brake to a wheel of the vehicle, (d) second detecting means for detecting an actual deceleration value of the vehicle body, and (e) control means for controlling the braking means such that the actual deceleration value of the vehicle body coincides with a target or desired deceleration value which is determined on the basis of the operating amount of the brake operating member.

In the electrically controlled brake system as disclosed in the above publication JP-A 63-20256, the hydraulic pressure in an accumulator is controlled by a solenoid-operated pressure control valve, and the controlled hydraulic pressure is applied to the wheel brake cylinder, to force a brake pad as the friction member against the rotor, so that the wheel rotating with the rotor is braked. The pressure control valve has a pressure-increase position, a pressure-hold position and a pressure-decrease position, for increasing, holding and lowering the pressure applied to the wheel cylinder, respectively. These three positions are suitably selected, with a controlled amount of current applied to a solenoid coil of the valve, so that the hydraulic pressure applied to the wheel cylinder is proportional to the amount of current applied to the solenoid coil. In this brake system, the braking effect is detected in the form of the deceleration value of the vehicle body, and the amount of current applied to the solenoid coil is determined so as to control the hydraulic pressure applied to the wheel cylinder such that the detected actual deceleration value of the vehicle coincides with the target or desired deceleration value determined based on the electrically detected operating amount of the brake operating member.

Another type of electrically controlled brake system is disclosed in JP-A 63-242764, wherein a brake pad which is driven by a motor is forced against the rotor to apply brake to the wheel rotating with the rotor, and the braking effect is detected in the form of a reaction force upon braking of the wheel, more particularly, in the form of an amount of strain of a support member which supports the brake pad and motor, which strain occurs due to a reaction force applied from the rotor to the support member in the circumferential direction of the rotor. The amount of operation of the motor is controlled such that the detected amount of strain or reaction force coincides with a target reaction force determined on the basis of the detected operating amount of the brake operating member.

In the known electrically controlled brake systems as described above, the second detecting means is adapted to detect the deceleration value of the vehicle body such that the deceleration is a decrease in the forward running speed of the vehicle, while on the other hand a decrease in the backward running speed is the acceleration of the vehicle body. Namely, the sign of the electrically detected value of deceleration of the vehicle in the forward and backward running directions is determined to represent the deceleration and acceleration of the vehicle as described above. Although the above arrangement assures suitable control of the braking means when the vehicle is running in the forward direction, the arrangement suffers from an unnecessarily large braking force applied to the wheel, during a backward running of the vehicle, since the decrease in the backward running speed is detected as the acceleration, which means a shortage of the braking force.

The known brake systems also suffer from an unnecessarily large braking force applied to the wheel when the braking means is activated while the vehicle is in a stop state. Described in detail, the actual braking effect in the form of the deceleration value or reaction force indicated above is substantially zero when the vehicle is stopped, and is greatly different from the target deceleration value or target reaction force which is determined by the detected operating amount of the brake operating member. As a result, the amount of braking applied to the wheel is increased so that the actual braking effect coincides with the target value. However, the actual braking effect cannot be increased as long as the vehicle is in the stop state, whereby the control means continues to! increase the amount of braking, resulting in an excessive rise in the braking force applied to the wheel cylinder, brake pad, rotor and other components of the braking means. Consequently, the durability of the brake system is deteriorated.

SUMMARY OF THE INVENTION

It is therefore a first object of the present invention to provide an electrically controlled brake system capable of providing a braking effect corresponding to the detected operating amount of the brake operating member, irrespective of whether the vehicle is running in the forward direction or in the backward direction.

A second object of the invention is to provide an electrically controlled brake system capable of providing a braking effect corresponding to the detected operating amount of the brake operating member while the vehicle is running, and applying to the vehicle wheel a braking force which corresponds to the operating amount of the brake operating member while the vehicle is in a stop state.

The above first object may be achieved according to a first aspect of the present invention, which provides an electrically controlled brake system for a wheel of a vehicle, comprising: (a) a brake operating member; (b) first detecting means for detecting an operating amount of the brake operating member; (c) braking means for applying a brake to the wheel; (d) second detecting means for detecting an actual braking effect provided by the braking means, the second detecting means detecting the actual braking effect in the form of a positive value when the vehicle is running in one of a forward direction and a backward direction, and in the form of a negative value when the vehicle is running in the other of the forward and backward directions; and (e) control means for determining a positive value as a target braking effect on the basis of the operating amount detected by the first detecting means. The control means controls the braking means such that an absolute value of the actual braking effect detected by the second detecting means coincides with the positive value of the target braking effect.

In the electrically controlled brake system of the present invention constructed as described above, the actual braking effect is detected in the form of a positive or negative value depending upon the running direction of the vehicle, and the absolute value of the actual braking effect is compared with the determined positive value of the target braking effect. Therefore, the difference of the detected actual braking effect from the determined target braking effect can be correctly determined irrespective of the running direction of the vehicle, so that the braking means can be suitably controlled by the control means, so as to zero the difference.

According to the present brake system, the braking effect (in the form of the vehicle deceleration value, for example) which corresponds to the detected operating amount of the brake operating member can be obtained even when the vehicle is running in the backward direction, as well as when the vehicle is running in the forward direction.

Where the second detecting means detects the actual braking effect as a positive or negative value depending upon the forward or backward running direction of the vehicle, the comparison of the detected value of the actual braking effect can be compared with the value of the target braking effect, by reversing the sign of the output signal of the second detecting means (sign of the detected value of the actual braking effect) or the sign the value of the target braking effect, depending upon the running direction of the vehicle. However, this arrangement requires suitable means for determining the running direction of the vehicle, and suitable means for reversing the sign of the value of the actual or target braking effect, whereby the control arrangement is accordingly complicated. To the contrary, the present brake system is adapted such that the absolute value of the detected actual braking effect is compared with the positive value of the target braking effect, irrespective of the running direction of the vehicle. Accordingly, the control arrangement is simplified according to the present invention.

The second object indicated above may be achieved according to a second aspect of the present invention, which provides an electrically controlled brake system for a wheel of a vehicle, comprising: (a) a brake operating member; (b) first detecting means for detecting an operating amount of the brake operating member; (c) braking means for applying a brake to the wheel; (d) second detecting means for detecting an actual braking effect provided by the braking means; (e) primary control means for controlling the braking means such that the actual braking effect detected by the second detecting means coincides with a target braking effect determined on the basis of the operating amount of the brake operating member detected by the first detecting means; and (f) auxiliary control means operable when the vehicle is in a stop state. The auxiliary control means controls the braking means such that an operating force of the braking means corresponds to the operating amount of the brake operating member detected by the first detecting means.

In the electrically controlled brake system constructed according to the second aspect of this invention as described above, the actual braking effect is not compared with the target braking effect, while the vehicle is in the stop state. Therefore, the amount of braking to the wheel is not increased even though the actual braking effect is zero and is not coincident with the target braking effect. That is, the operating force of the braking means is determined depending upon the operating amount of the brake operating member, which represents the amount of braking desired by the operator of the brake operating member. Thus, while the vehicle is in the stop state, the auxiliary control means functions in the same manner as in an ordinary brake system in which the operating force of the braking means is determined according to the operating amount of the brake operating member. Hence, the present arrangement assures improved life expectancy of the braking means, being free from deterioration of the components due to unnecessarily large braking force applied thereto.

The operating force of the braking means while the vehicle is in the stop state may be made constant regardless of the operating amount of the brake operating member. In this case, the amount of braking to the wheel will not become excessive even in the stop state of the vehicle. However, the brake operating force in the stop state does not reflect the vehicle driver's desire as represented by the operating amount of the brake operating member. The above arrangement incorporating the auxiliary control means permits the vehicle driver to change the brake operating force by changing the operating amount of the brake pedal, even while the vehicle is stopped.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
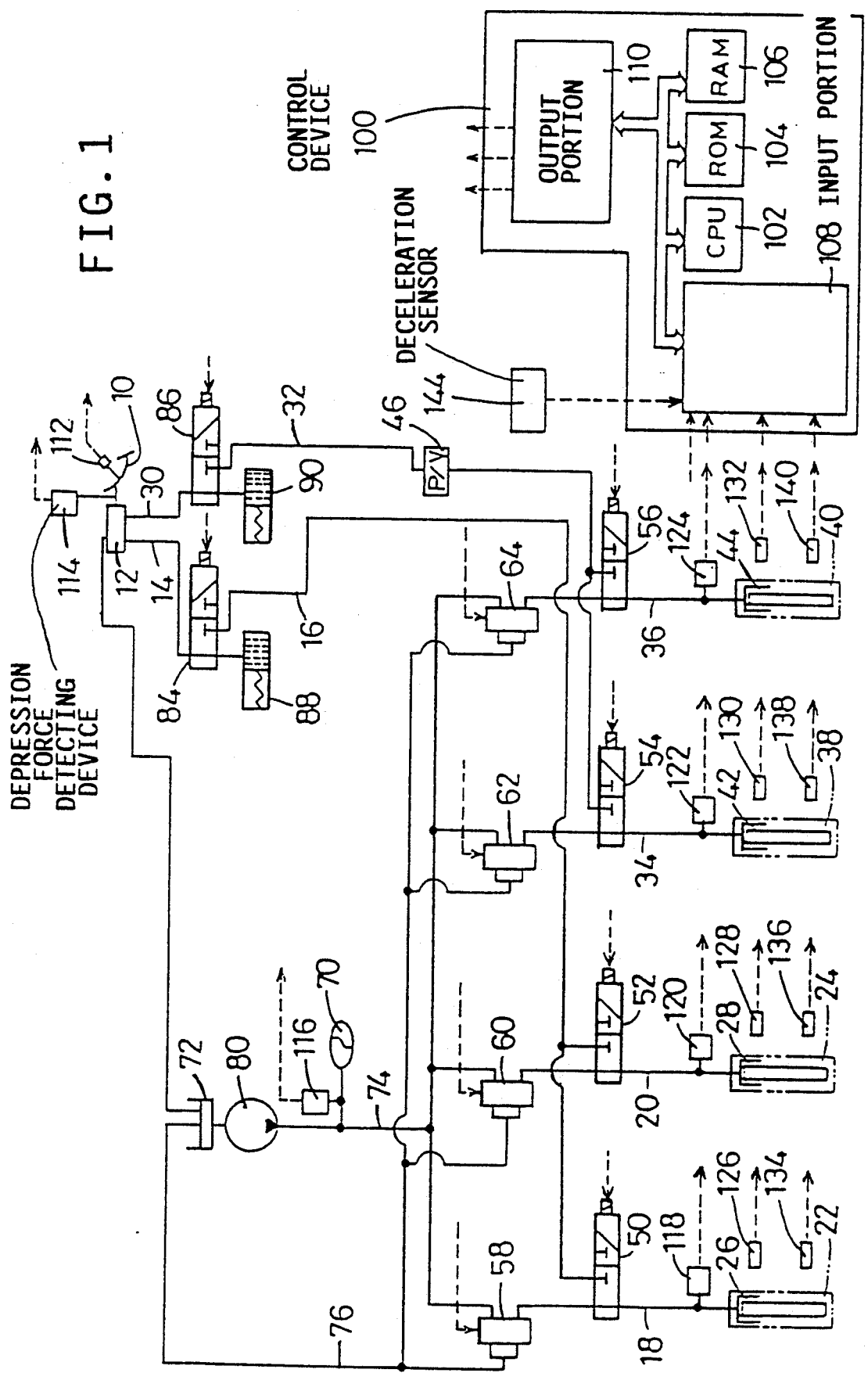
FIG. 1 is a schematic view showing an electrically controlled brake system for a motor vehicle, which is constructed according to one embodiment of the present invention.

Referring first to FIG. 1, reference numeral 10 denotes a brake operating member in the form of a brake pedal, which is connected to a master cylinder 12. When the brake pedal 10 is operated, a brake fluid in each of two pressurizing cheers of the master cylinder 12 is pressurized to deliver a pressurized fluid whose pressure corresponds to the operating force which acts on the brake pedal 10. In the present embodiment, this operating force is used as a parameter representing the operating amount of the brake pedal 10.

One of the two pressurizing chambers of the master cylinder 12 is connected, through fluid passages 14, 16 and branch lines 18, 20, to brake cylinders 26, 28 of friction brakes provided for left-front and right-front wheels 22, 24 of a motor vehicle. The other pressurizing chamber of the master cylinder 12 is connected, through fluid passages 30, 32 and branch lines 34, 36, to wheel brake cylinders 42, 44 of friction brakes provided for left-rear and right-rear wheels 38, 40 of the vehicle. As is well known in the art, each friction brake includes a nonrotatable friction member which is driven by the wheel brake cylinder 26, 28, 42, 44, to be forced against a rotor which rotates with the wheel 22, 24, 38, 40. A reference numeral 46 denotes a proportioning valve provided in the fluid passage 32 for the rear wheel brake cylinders 42, 44.

Four solenoid-operated directional control valves 50, 52, 54, 56 are provided in the branch lines 18, 20, 34, 36, respectively. These directional control valves 50, 52, 54, 56 are connected to respective pressure control valves 58, 60, 62, 64. A solenoid coil of each of the four solenoid-operated directional control valves 50-56 is normally deenergized, so that the directional control valves are normally placed in their non-operated position indicated in FIG. 1, so that the wheel brake cylinders 26, 28, 42, 44 communicate with the respective pressure control valves 58-64. When the solenoid coils of the directional control valves 50-56 are energized, these valves are operated to their operated position, so that the wheel brake cylinders 26, 28, 42, 44 communicate with the master cylinder The pressure control valves 58-64 are connected to an accumulator 70 and a reservoir 72, through fluid passages 74, 76. The fluid in the reservoir 72 is pressurized by a hydraulic pump 80, and the pressurized fluid is stored in the accumulator 70 so that the pressure in the accumulator 70 is held within a predetermined range. By suitably controlling the amounts of current applied to the solenoid coils of the pressure control valves 58-64, the pressure of the fluid from the accumulator 70 is controlled by these valves 58-64 to a level suitable for braking the wheels 22, 24, 38, 40, and the thus controlled braking pressure is applied to the wheel brake cylinders 26, 28, 42, 44 to activate the respective friction brakes for applying brake to the wheels. In the present embodiment, the friction brakes including the wheel brake cylinders 26, 28, 42, 44 cooperate with the pressure control valves 58-64, accumulator 70, pump 80, etc., to constitute braking means for applying brake to the wheels.

A solenoid-operated directional control valve 84 is provided between the fluid passages 14 and 16 connecting the master cylinder 12 and the front wheel brake cylinders 26, 28. Another solenoid-operated directional control valve 86 is provided between the fluid passages 30 and 32 connecting the master cylinder 12 and the rear wheel brake cylinders 42, 44. To these directional control valves 84, 86, there are connected brake simulators 88, 90, respectively. The brake simulators 88, 90 are adapted to accommodate the pressurized fluid received from the master cylinder 12, so as to permit a depressing action of the brake pedal 10, and gives the brake pedal 10 a reaction force corresponding to the operating amount or stroke of the brake pedal 10, since the pressure within each brake simulator 88, 90 increases with an increase in the amount of the fluid accommodated in the simulator. When the wheels 22, 24, 38, 40 are braked by the braking pressures controlled by the pressure control valves 58-64, that is, when the hydraulic pressure source 70, 72, 80 is normal, the solenoid coils of the directional control valves 84, 86 are deenergized for fluid communication of the master cylinder 12 with the brake simulators 88, 90. In this condition, the brake simulators 88, 90 function to give the operator of the brake pedal 10 a feeling as if the brake cylinders 26, 28, 42, 44 were operated by the pressurized fluid supplied from the master cylinder 12.

When the hydraulic pressure source 70, 72, 80 is defective, the solenoid coils of the directional control valves 84, 86 are energized for fluid communication of the master cylinder with the wheel brake cylinders 26, 28, 42, 44 through the directional control valves 50-56, which are placed in the operated position with their solenoid coils being energized.

The present brake system uses a control device 100, which incorporates a central processing unit (CPU) 102, a read-only memory (ROM) 104, a random-access memory (RAM) 106, an input portion 108 and an output portion 110, which are interconnected to each other by a bus. To the input portion 108 of the control device 100, there are connected the following components: a brake switch 112 for detecting an operation or a depressing action of the brake pedal 10; a depression-force detecting device 114 which detects the depressing force acting on the brake pedal 10, which serves as detecting means for detecting the operating amount of the brake pedal 10; wheel cylinder pressure sensors 118, 120, 122, 124 for detecting the fluid pressures in the respective wheel brake cylinders 26, 28, 42, 44; wheel speed sensors 126, 128, 130, 132 for detecting the rotating speeds of the respective front and rear wheels 22, 24, 38, 40; vehicle height sensors 134, 136, 138, 140 for detecting the heights of the vehicle body at the respective wheels 22, 24, 38, 40; and a deceleration sensor 144 for detecting a deceleration value G of the vehicle body in the running direction of the vehicle.

The deceleration sensor 144 includes a sectorial weight which is supported pivotally about a pivot axis which is parallel to the transverse direction of the vehicle. The sectorial weight has a multiplicity of slits which are spaced apart from each other at an extremely small pitch along a circular arc whose center lies on the pivot axis indicated above, and further has two cutouts which are spaced apart from each other by a relatively large distance in the circumferential direction of the sector of the weight. The sensor 144 also includes a photoelectric detector for photoelectrically detecting the slits and cutouts, and thereby detecting the original position and the pivoting direction and angle of the weight, in order to determine the deceleration value G in the forward and backward running directions of the vehicle. The deceleration sensor 144 is adapted such that the value of the output of the sensor when the vehicle is running in the forward direction is positive, while the value of the output when the vehicle is running in the backward direction is negative.

Figure 2:
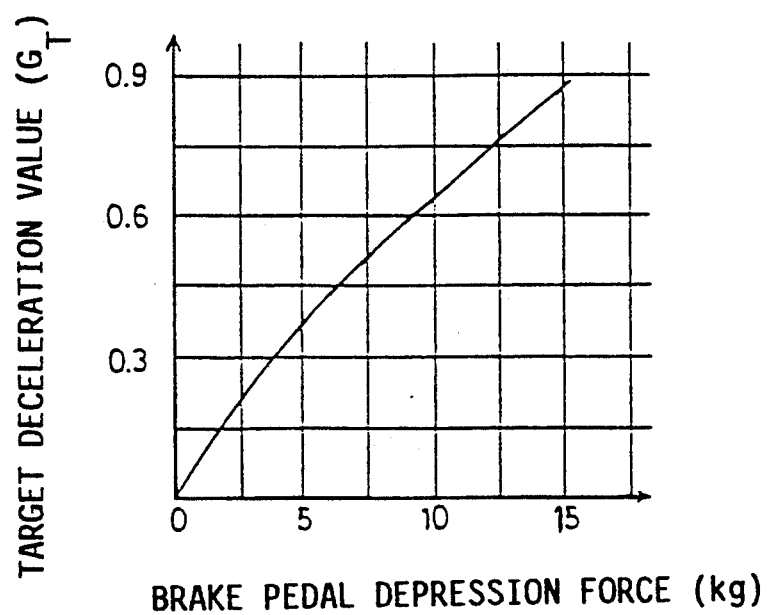
FIG. 2 is a graph indicating a predetermined relationship between an operating amount of a brake pedal and a target deceleration value of the vehicle, which relationship is used in a wheel braking control routine performed by the brake system of FIG. 1.

To the output portion 110 of the control device 100 are connected the pressure control valves 58-64 and solenoid-operated directional control valves 50, 52, 54, 56, 84 and 86. The ROM 104 stores a data map representative of the relationship between the depression force of the brake pedal 10 and a target deceleration value $G_T$ of the vehicle, as indicated in the graph of FIG. 2. The ROM 104 further stores various control programs such as a wheel braking control routine as illustrated in the flow chart of FIG. 3. Referring to this flow chart, the wheel braking control routine will be described.

When the hydraulic pressure source 70, 72, 80 and the pressure control valves 58-64 are normal, the solenoid coils of the directional control valves 50-56, and 84, 86 are all in the deenergized state, so that the wheel brake cylinders 26, 28, 42, 44 communicate with the accumulator 70 through the directional control valves 50-56 and pressure control valves 58-64, while the master cylinder 12 communicates with the brake simulators 88, 90 through the directional control valves 84, 86. When an ignition switch is turned on to start the engine of the vehicle, a main control routine (not shown) for controlling the vehicle is started with an initialization step in which a friction coefficient $\mu$ of the friction members (friction pads) of the friction brakes is set to a standard value $\mu_B$. The friction coefficient $\mu$, which is used in step S9 of the wheel braking control routine as described below, is stored in the RAM 106 of the control device 100. Namely, the standard value $\mu_B$ is written in the appropriate memory area of the RAM 106 in the initializing step of the main control routine. The standard value $\mu_B$ is a theoretically determined value, or a friction coefficient $\mu$ of the friction members which is measured at the normal operating temperature when the friction members are dry.

Figure 3:
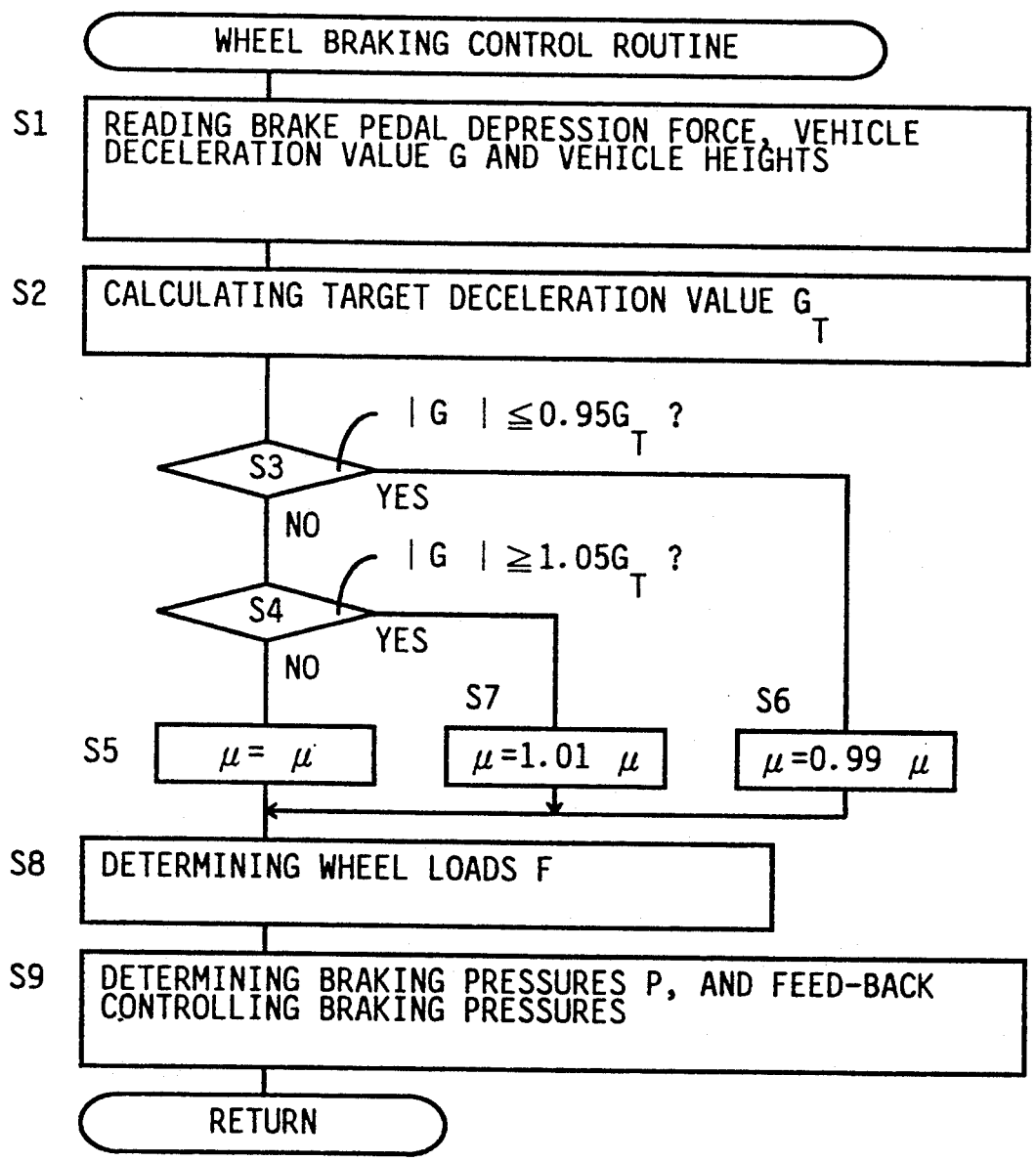
FIG. 3 is a flow chart illustrating the wheel braking control routine, which is stored in a read-only memory in a computer which constitutes a major part of a control device of the brake system.

Upon depression of the brake pedal 10, the wheel braking control routine of FIG. 3 is executed, starting with step S1 to read the outputs of the detecting device 114, deceleration sensor 144, and vehicle height sensors 134, 136, 138, and 140 that is, to read the depression force of the brake pedal 10, and the deceleration value G and heights of the vehicle body. Step S1 is followed by step S2 in which a target deceleration value $G_T$ of the vehicle body is calculated on the basis of the depression force (kg) of the brake pedal 10, and according to the predetermined relationship of FIG. 4 between the depression force and the target deceleration value $G_T$, which relationship is represented by the data map stored in the ROM 104.

Then, steps S3-S7 are implemented to determine the friction coefficient $\mu$ of the friction members, which is used for determining the braking pressures to be applied to the wheel brake cylinders 26, 28, 42, 44. The determination of the friction coefficient $\mu$ is effected depending upon the ratio of the absolute value of the detected actual deceleration value G with respect to the determined target deceleration value $G_T$. Since the determined target deceleration value $G_T$ is a positive value, the absolute value of the actual deceleration value G is compared with the positive target deceleration value $G_T$, so that the magnitude of the actual deceleration value G with respect to the target deceleration value $G_T$ can be obtained irrespective of whether the vehicle is running in the forward direction or in the backward direction.

Described more particularly, step S3 is implemented to check to see if the absolute value of the actual deceleration value G is equal to or smaller than 95% of the target deceleration value $G_T$. If so, an affirmative decision (YES) is obtained in step S3, and step S6 is implemented to change the currently effective friction coefficient $\mu$ (currently stored in the RAM 106) to $0.99\mu$. When the present routine is executed for the first time after the brake pedal 10 is depressed, the currently effective friction coefficient $\mu$ is equal to the standard friction coefficient $\mu_B$ initially stored in the initialization step described above. In this case, the friction coefficient $\mu$ is changed to $0.99\mu_B$ in step S6.

If the absolute value of the detected actual deceleration value G is greater than 95% of the target deceleration value $G_T$, step S3 is followed by step S4 to check to see if the absolute value of the actual deceleration value G is equal to or greater than 105% of the target deceleration value $G_T$. If so, an affirmative decision (YES) is obtained in step S4, and step S7 is implemented to change the currently stored friction coefficient $\mu$ to $1.01\mu$. If the absolute value of the actual deceleration value G is larger than 95% and smaller than 105% of the target deceleration value $G_T$, the control flow goes to step S5 to maintain the currently stored friction coefficient $\mu$.

It will be understood that the friction coefficient $\mu$ is reduced in increments of 1% each time the routine of FIG. 3 is executed, as long as the absolute value of the detected actual deceleration value G is equal to or smaller than 95% of the target deceleration value $G_T$, and that the friction coefficient $\mu$ is increased in increments of 1% for each execution of the routine, as long as the absolute value of the detected actual deceleration value G is equal to or larger than 105% of the target value $G_T$. The friction coefficient $\mu$ remains unchanged as long as the absolute value G is within the range of 95-105% of the target value $G_T$.

Steps S5-S7 are followed by step S8 in which the loads F acting on the front and rear wheels 22, 24, 38, 40 are determined. The loads of the four wheels are different from each other, due to the structure of the vehicle and a load transfer from the rear portion to the front portion of the vehicle body upon braking during forward running of the vehicle, for example. This means that the application of the same braking force to the four wheels will not cause the four wheels to start locking at the same time. For applying a suitable braking force to each wheel, the load acting on each wheel is determined with precision. The load Ffl of the left-front wheel 22 is calculated according to the following equation (1):

$$Ffl = Wfl + \{(H \cdot Gx)/2L - (H \cdot Rf \cdot Gy)/T\} \cdot M \qquad (1)$$

where,
Wfl: Portion of the vehicle weight acting on the left-front wheel 22 at standstill
H: Height of gravity center of the vehicle
Gx: Longitudinal deceleration of the vehicle
L: Wheel base of the vehicle
Rf: Roll stiffness distribution ratio of front wheels
Gy: Transverse deceleration
T: Tread of the vehicle
M: Mass of the vehicle Upon brake application to the vehicle, there arises a moment (M·H·Gx), which is counterbalanced with a moment (F·L), where F represents a reaction force F applied on the road surface to the front wheels. Therefore, the reaction force F is expressed by an equation $F = (M \cdot H \cdot Gx)/L$. Since the reaction force F acts on the left-front and right-front wheels 22, 24, the load on the left-front wheel 22 increases by $(M \# H \cdot Gx)/2L$ when the vehicle is braked.

When the vehicle is turned, a load transfer in the transverse direction of the vehicle occurs, and there arises a moment (M·H·Gy), which is counterbalanced with a moment (F·T), where F represents a reaction force applied from the road surface to the left-front and left-rear wheels 22, 38. Therefore, the reaction force F is expressed by an equation $F = (M \cdot H \cdot Gy)/T$. This reaction force F is distributed to the two left wheels 22, 38, depending upon the roll stiffness distribution ratios Rf, Rr. When the vehicle body is rotated about an axis parallel to the running or longitudinal direction of the vehicle, a restoring moment is transmitted from the suspension system to the sprung weight of the vehicle. The roll stiffness distribution ratio is a ratio of the portions of the restoring moment distributed to the front and rear wheels. An amount of change in the load acting on the left-front wheel 22 upon turning of the vehicle is equal to a product of (M·H·Gy)/T and the roll stiffness distribution ratio Rf of the front wheels 22, 24. If the transverse deceleration Gy is expressed as a positive value upon left turning of the vehicle, the load acting on the left-front wheel 22 decreases due to a transverse load transfer upon left turning of the vehicle, by an amount (M·H·Rf·Gy)/T, as indicated in the above equation (1). When the vehicle is turned right, the load on the wheel 22 increases by the same amount, since the transverse deceleration Gy is a negative value.

The load Ffr acting on the right-front wheel 24 is calculated according to the following equation (2):

$$Ffr = Wfr + \{(H \cdot Gx)/2L + (H \cdot Rf \cdot Gy)/T\} \cdot M \qquad (2)$$

where, Wfr: Portion of the vehicle weight acting on the right-front wheel 24 at standstill The load Ffr acting on the right-front wheel 24 increases due to a transverse load transfer upon left turning of the vehicle, and decreases upon right turning of the vehicle since the transverse deceleration Gy is a negative value.

The loads Frl and Frr on the left-rear and right-rear wheels 38, 40 are calculated according to the following equations (3) and (4), respectively:

$$Frl = Wrl - \{(H \cdot Gx)/2L + (H \cdot Rr \cdot Gy)/T\} \cdot M \qquad (3)$$

$$Frr = Wrr - \{(H \cdot Gx)/2L - (H \cdot Rr \cdot Gy)/T\} \cdot M \qquad (4)$$

where, Wrl: Portion of the vehicle weight acting on the left-rear wheel 38 at standstill
Rr: Roll stiffness distribution ratio of rear wheels
Wrr: Portion of the vehicle weight acting on the right-rear wheel 40 at standstill Upon brake application to the vehicle while running in the forward direction, the loads acting on the rear wheels 38, 40 decrease due to a longitudinal load transfer from the rear portion to the front portion of the vehicle, by an amount (M·H·Gx)/2L. The amount of load transfer upon left or right turning of the vehicle is equal to a product of (M·H·Gy)/T and the roll stiffness distribution ratio Rf of the rear wheels. The increase and decrease of the loads Frl, Frr upon left and right turning of the vehicle are the same as those of the loads Ffl, Ffr.

Step S8 for calculating the loads on the front and rear wheels 22, 24, 38, 40 is followed by step S9 in which the braking pressures Pfl, Pfr, Prl, Prr to be applied to the respective wheel brake cylinders 26, 28, 42, 44 are calculated according to the following equations (5)–(8):

$$Pfl = (Ffl \cdot G_T)/(\mu \cdot bf) \qquad (5)$$

$$Pfr = (Ffr \cdot G_T)/(\mu \cdot bf) \qquad (6)$$

$$Prl = (Frl \cdot G_T)/(\mu \cdot br) \qquad (7)$$

$$Prr = (Frr \cdot G_T)/(\mu \cdot br) \qquad (8)$$

where,
bf: Brake factor of the front wheels 22, 24
br: Brake factor of the rear wheels 38, 40

$$bf = 2 \cdot Af \cdot (r/R)$$

$$br = 2 \cdot Ar \cdot (r/R)$$

where, Af: Cross sectional area of piston of the front wheel brake cylinders 26, 28
Ar: Cross sectional area of piston of the rear wheel brake cylinders 42, 44
r: Effective radius of the rotor of the friction brakes
R: Effective radius of tires of the wheels As described above, the braking pressures to be applied to the wheel brake cylinders 26, 28, 42, 44 are increased with the friction coefficient $\mu$ being increased, when the detected actual deceleration value G is equal to or smaller than 95% of the determined target deceleration value $G_T$. In other words, when the actual braking effect produced by brake application is smaller than the target or desired value due to an insufficient amount of braking to the vehicle, the braking pressures P applied to the brake cylinders are increased so as to increase the amount of braking and thereby increase the actual braking effect in the form of the actual deceleration value G of the vehicle. When the detected actual deceleration value G is equal to or larger than 105% of the target value $G_T$, this means that the amount of braking to the vehicle is excessive. Accordingly, the friction coefficient $\mu$ used for calculating the braking pressures P is increased to reduce the braking pressures and thereby decrease the amount of braking.

In step S9, the amounts of current to be applied to the pressure control valves 58-64 are controlled in a feedback manner so that the braking pressures applied to the wheel brake cylinders 26, 28, 42, 44 coincide with the braking pressures P calculated as described above.

Thus, the braking pressures P are controlled depending upon the absolute value of the detected actual deceleration value G as compared with the target deceleration value $G_T$, so that the actual deceleration value G coincides with the target value $G_T$ which is determined on the basis of the operating amount of the brake pedal 10. The braking pressures P are increased with the friction coefficient $\mu$ being decreased in increments of 1% each time step S6 is implemented while the absolute value of the detected actual deceleration value G is 95% or lower of the target value $G_T$. The braking pressures P are decreased with the friction coefficient $\mu$ being increased in increments of 1% each time step S7 is implemented while the absolute value of the detected actual deceleration value G is 105% or larger of the target value $G_T$. While the absolute value of the actual deceleration value G is between 95% and 105% of the target value $G_T$, the friction coefficient $\mu$ remains unchanged, in spite of some difference between the actual and target deceleration values G and $G_T$, whereby otherwise possible frequent operations of the pressure control valves 58-64 to increase or decrease the braking pressures are avoided so as to prevent pressure pulsation in the brake system.

In the present embodiment, the deceleration sensor 144 functions as means for detecting the actual braking effect, and steps S1-S9 of the wheel braking control routine of FIG. 3 corresponds to control means for controlling the friction brakes including the wheel brake cylinders 26, 28, 42, 44 such that the actual braking effect coincides with the target braking effect determined on the basis of the depression force acting on the brake pedal 10.

Figure 4:
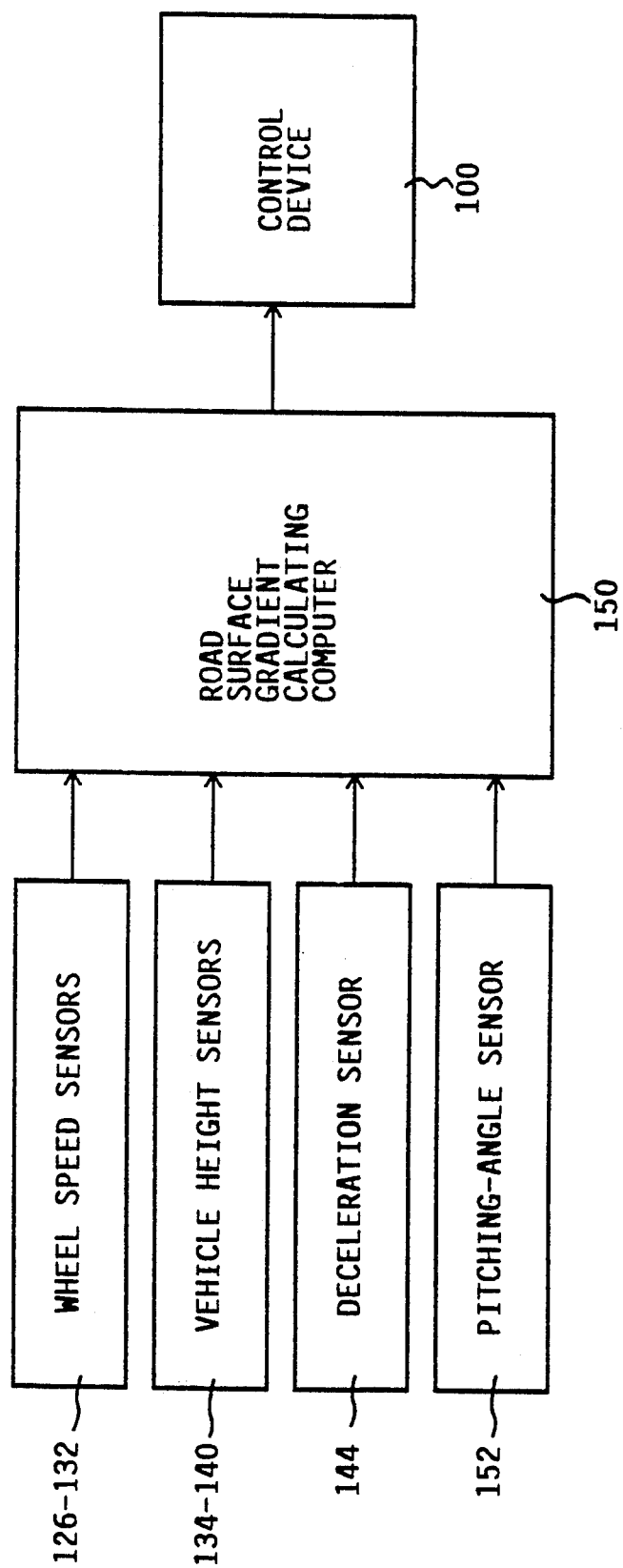
FIG. 4 is a block diagram illustrating an arrangement including a computer for calculating the gradient of the road surface on which the vehicle is running, together with a wheel braking control device, according to another embodiment of the present invention.
Figure 5:
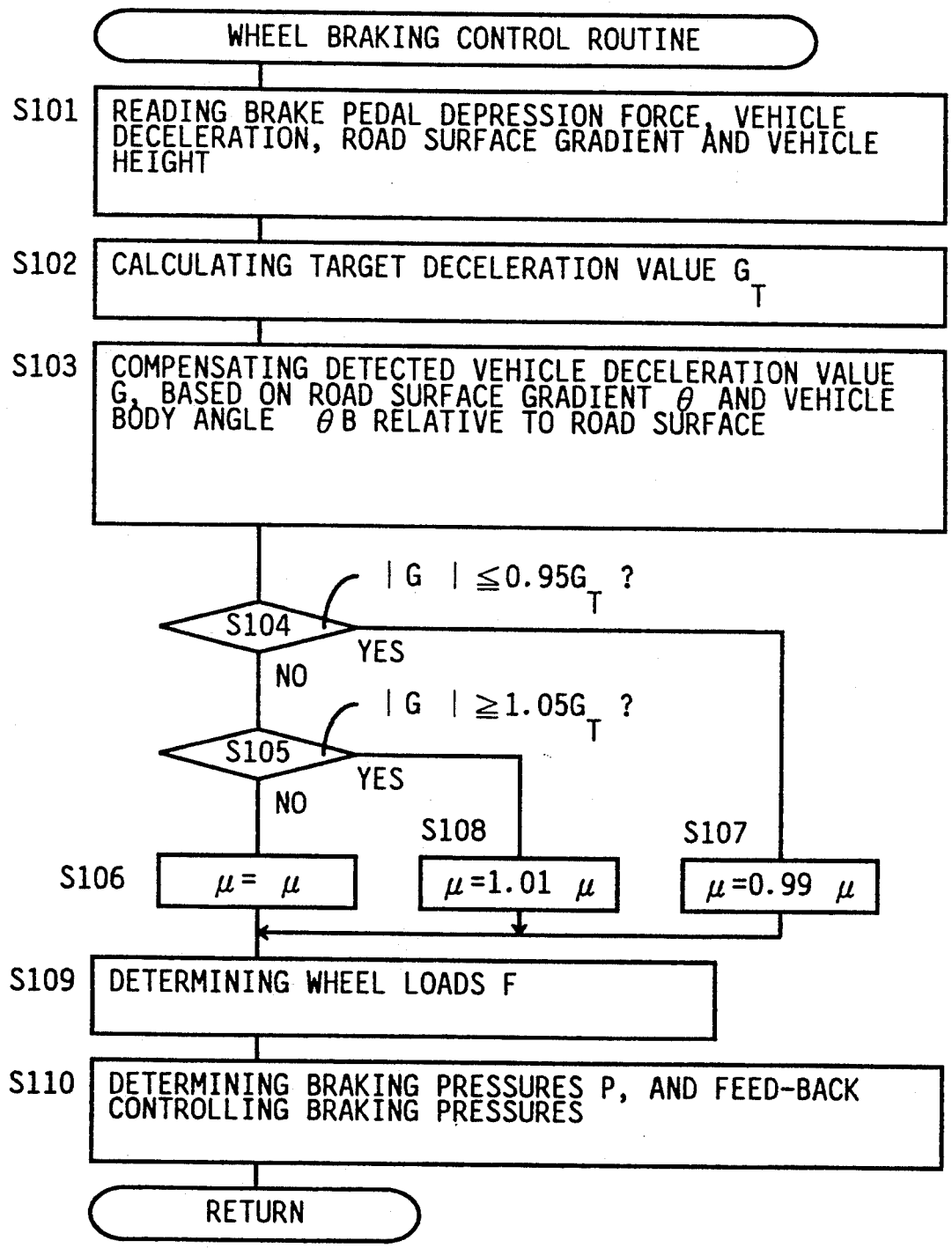
FIG. 5 is a flow chart illustrating a wheel braking control routine stored in a read-only memory in a computer which constitutes a major part of the control device of the embodiment of FIG. 4.
Figure 6:
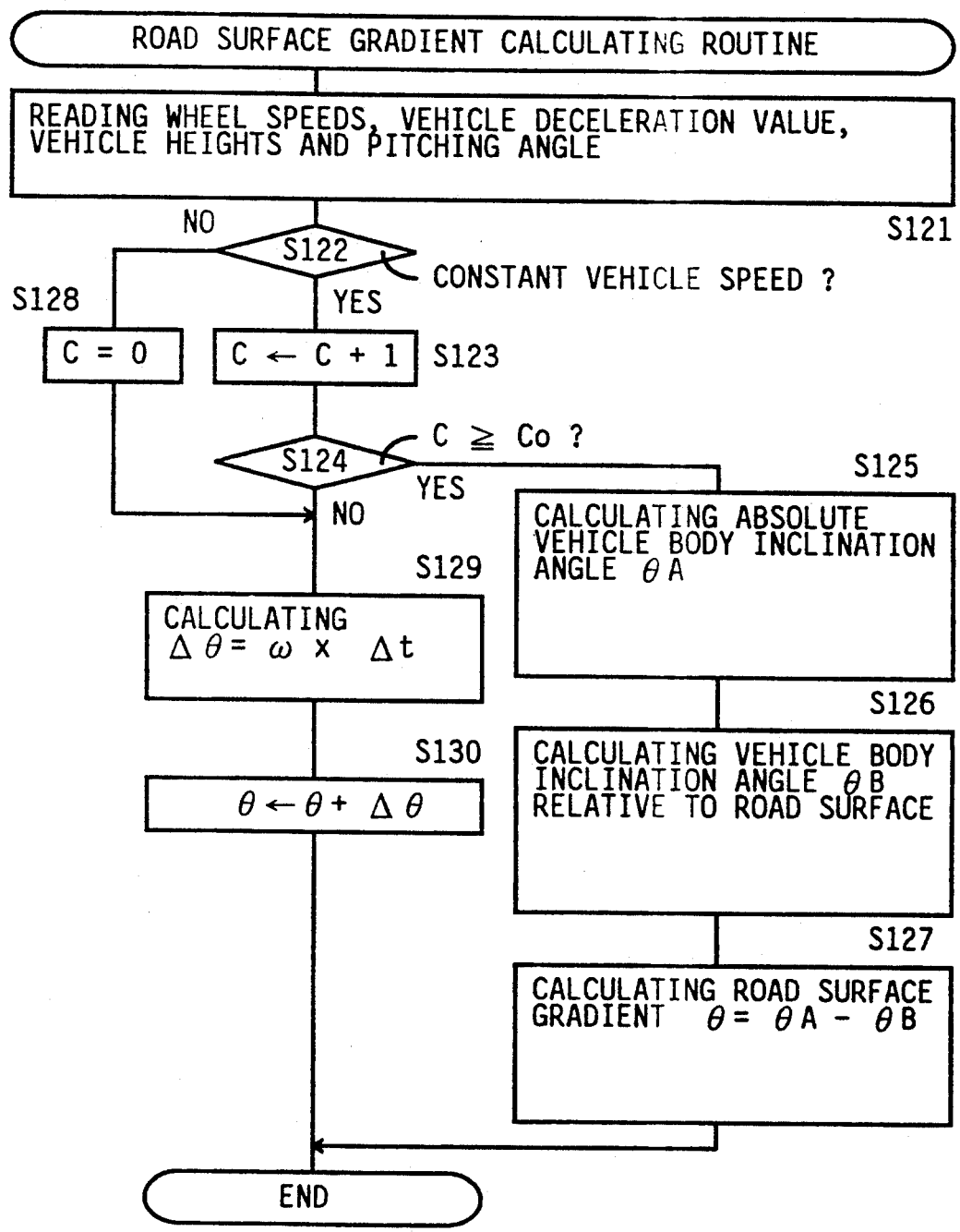
FIG. 6 is a flow chart illustrating a road surface gradient calculating routine stored in a read-only memory in the computer for calculating the gradient.

Referring to FIGS. 4-6, there will be described another embodiment of this invention, which is adapted to compensate the actual deceleration value G detected by the deceleration sensor 144, for variations in the inclination angle of the vehicle body relative to the road surface and in the gradient of the road surface. As described above, the deceleration sensor 144 uses the weight whose direction and angle of pivotal movement about the axis parallel to the running or longitudinal direction of the vehicle represent the deceleration of the vehicle. It is noted that the inclination angle of the vehicle body relative to the road surface and the gradient of the road surface influence the angle of pivotal movement of the weight of the sensor 144. In other words, the deceleration value as represented by the output of the deceleration sensor 144 includes some error with respect to the actual deceleration value G, since the output of the sensor 144 includes a component corresponding to the vehicle body angle and the road surface gradient. Therefore, the determination of the braking pressures P on the basis of the actual deceleration value G as represented by the output of the sensor 144 would cause a deviation of the actual deceleration value from the target value determined by the depression force of the brake pedal 10. To avoid this deviation, the actual deceleration value G as detected by the sensor 144 is compensated before it is compared with the target value $G_T$.

The gradient $\theta$ of the road surface is calculated by a road surface gradient calculating computer 150 as shown in FIG. 4. To this computer 150, there are connected the wheel speed sensors 126-132, vehicle height sensors 134-140 and deceleration sensor 144, which are described above with respect to the first embodiment. To the computer 150, there is also connected a pitching-angle or pitch-rate sensor 152, which detects a pitch velocity $\omega$, namely, an angle of pitching (pitch rate) of the vehicle body about an axis parallel to the transverse direction of the vehicle. The sensor 152 is similar in construction to a yawing-angle or yaw-rate sensor which detects an angular velocity about the vertical axis, utilizing the Coriolis' force. The sensor 152 has the pivot axis parallel to the transverse direction of the vehicle. The computer 150 incorporates a read-only memory which stores a road surface gradient calculating routine illustrated in the flow chart of FIG. 6. The road surface gradient $\theta$ is calculated according to this routine, and the calculated gradient 8 is fed from the computer 150 to the control device 100, so that the gradient 8 is used in step S103 of the wheel braking control routine illustrated in the flow chart of FIG. 5.

The road surface gradient calculating routine of FIG. 6 is initiated with step S121 to read the outputs of the sensors 126-132, 144, 134-140 and 152, namely, the wheel speeds, deceleration value G, heights and pitch velocity $\omega$ of the vehicle body. Step S121 is followed by step S122 to determine whether the vehicle speed is substantially constant. This determination is effected by comparing the vehicle speed value detected in step S122 in the last cycle of execution of the routine, with the vehicle speed value detected in step S122 in the present cycle of execution. If a difference between these vehicle speed values is within a predetermined range, the vehicle speed is determined to be substantially constant, and an affirmative decision (YES) is obtained in step S122.

When the affirmative decision is obtained in step S122, step S123 is implemented to increment a count C. Step S123 is followed by step S124 to determine whether or not the current count C is equal to or larger than a predetermined number $C_0$. That is, steps S122-S124 are provided to determine whether the vehicle speed is held substantially constant for at least a predetermined time duration corresponding to the number $C_0$. In an initial period following the commencement of the routine of FIG. 6, a negative decision (NO) is obtained in step S124, and the control flow goes to step S129 in which an amount of change $\Delta\theta$ in the pitching angle of the vehicle body is calculated on the basis of the output of the sensor 152. That is, the amount of change $\Delta\theta$ is obtained by multiplying the pitch velocity $\omega$ by a cycle time $\Delta t$ of the routine of FIG. 6. Step S129 is followed by step S130 in which the amount of change $\Delta\theta$ is added to the road surface gradient $\theta$, which will be described.

If the vehicle speed is held substantially constant for the predetermined time duration corresponding to the predetermined number $C_0$, an affirmative decision (YES) is obtained in step S124, and step S125 is implemented to calculate an absolute inclination angle $\theta A$ of the vehicle body, on the basis of the output of the deceleration sensor 144. When the vehicle speed is substantially constant, the deceleration G is zero, and the output of the sensor 144 corresponds to the inclination angle $\theta A$ of the vehicle body. This inclination angle $\theta A$ is a sum of an inclination angle $\theta B$ of the vehicle body relative to the road surface, and the gradient of the road surface. In step S126, the inclination angle $\theta B$ of the vehicle body relative to the road surface is calculated on the basis of the outputs of the vehicle height sensors 134-140. Step S126 is followed by step S127 in which the gradient $\theta$ of the road surface is calculated by subtracting the relative inclination angle $\theta B$ from the absolute inclination angle $\theta A$ of the vehicle body. As long as the vehicle speed is held substantially constant, steps S122-S127 are repeatedly implemented to update the road surface gradient $\theta$. When the vehicle speed begins to change, a negative decision (NO) is obtained in step S122, and the control flow goes to step S128 in which the count C is reset to zero. Then, steps S129 and S130 are implemented to calculate the amount of change $\Delta\theta$ in the pitching angle of the vehicle body, and add the calculated amount of change $\Delta\theta$ to the road surface gradient $\theta$. When the vehicle speed is decreasing, for example, the output of the sensor 144 includes a component corresponding to the deceleration G of the vehicle, and the gradient $\theta$ calculated in steps S125-S127 is not accurate. For this reason, steps S129 and S130 are executed while the vehicle speed is changing, in order to compensate the gradient $\theta$ for the deceleration value G, by adding the amount of change $\Delta\theta$ calculated based on the output of the pitching-angle sensor 152.

Regardless of whether the vehicle speed is constant or changing, the road surface gradient $\theta$ may be obtained by calculating the amount of change $\Delta\theta$ in the pitching angle of the vehicle body which in turn is obtained based on the pitch velocity $\omega$ detected by the sensor 152. If the gradient $\theta$ is always obtained from the output of the pitching-angle sensor 152, an error in the output of the sensor 152 may be accumulated and a cumulative error may be included in the calculated gradient $\theta$. To avoid this, the present embodiment is adapted to calculate the road surface gradient $\theta$ based on the output of the deceleration sensor 144 and the angle of inclination of the vehicle body, while the vehicle speed is substantially constant. Since the gradient $\theta$ is obtained based on the output of the pitching-angle sensor 152 only while the vehicle speed is changing, the cumulative error of the sensor 152 which may be included in the calculated gradient $\theta$ is eliminated each time the vehicle speed becomes substantially constant.

As described above, the road surface gradient 8 is calculated by implementing steps S125-S127 while the vehicle speed is substantially constant, and by implementing steps S129 and S130 while the vehicle speed is not substantially constant. The calculated gradient $\theta$ is fed from the computer 150 to the control device 100 whose read-only memory 104 stores the wheel braking control routine as illustrated in the flow chart of FIG. 5. This routine is started with step S101 to read the depression force of the brake pedal 10, deceleration value G of the vehicle, road surface gradient $\theta$, and vehicle heights. Step S101 is followed by step S102 to calculate the target deceleration value $G_T$. Then, the control flow goes to step S103 in which the detected actual deceleration value G is compensated or adjusted, on the basis of the road surface gradient $\theta$ and the relative inclination angle $\theta B$ of the vehicle body, so that an influence of the gradient $\theta 0$ and angle $\theta B$ on the detected actual deceleration angle G is eliminated. Steps S104-S110 are identical with steps S3-S9 of the routine of FIG. 3 in the first embodiment, except that the detected actual deceleration value G used has been compensated in step S103 before its absolute value is compared with the target value $G_T$ in steps S104 and S105. The provision of step S103 assures more accurate control of the braking pressures P depending upon the depression force of the brake pedal 10.

Figure 7:
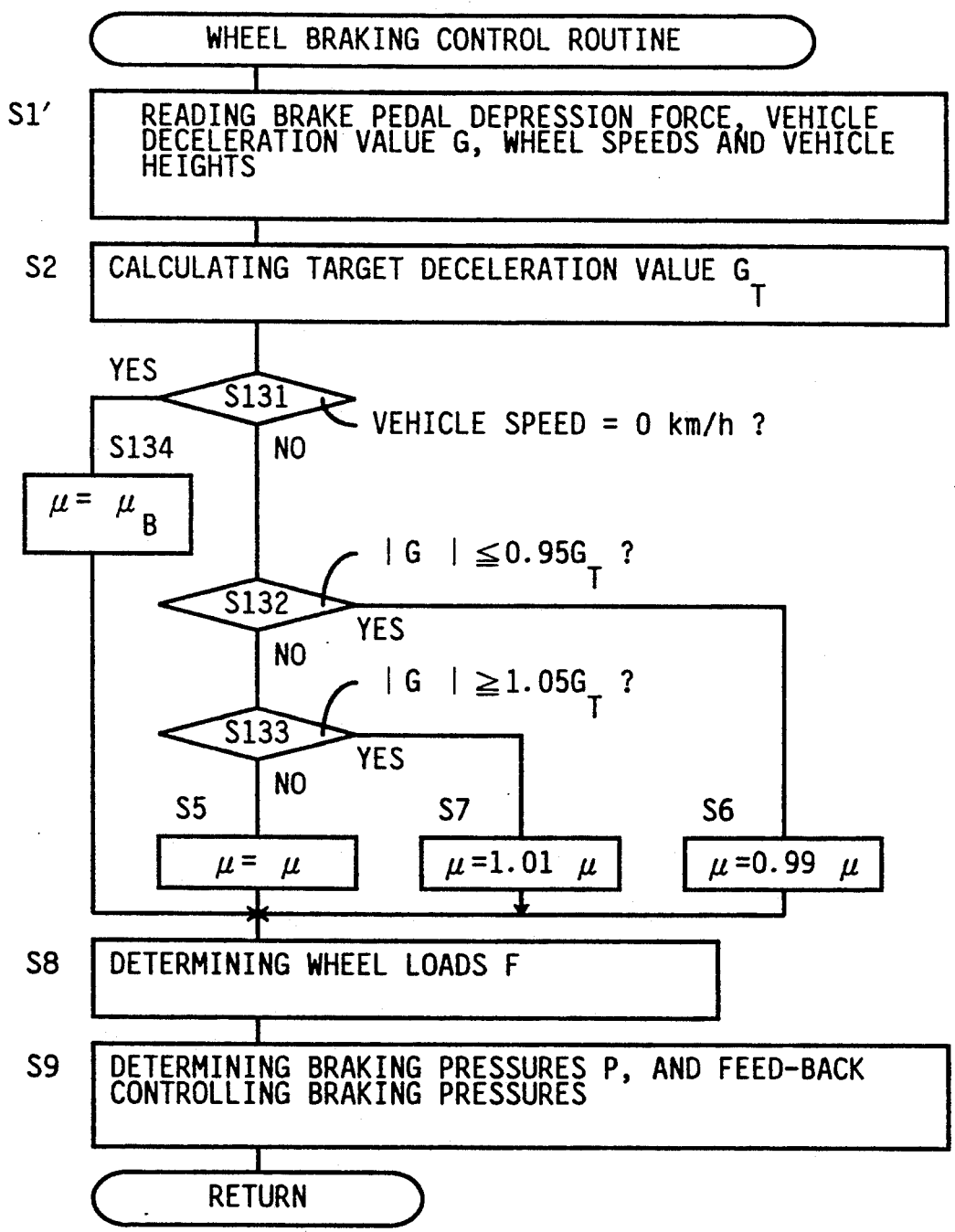
FIG. 7 is a flow chart illustrating a wheel braking control routine used in a further embodiment of this invention.

Referring next to the flow chart of FIG. 7 showing a wheel braking control routine, there will be described a third embodiment of this invention, which is a modification of the first embodiment illustrated in FIG. 3. The present third embodiment is adapted not to update the friction coefficient $\mu$ to change the braking pressures P when the vehicle is in the stop state, namely, when the vehicle speed is zero. Further, the present embodiment is adapted to control the braking pressures P such that the actual braking effect (actual deceleration value G) coincides with the target value (target deceleration value $G_T$), only when the vehicle is braked while the vehicle is running in the forward direction. For this reason, the detected actual deceleration value G as detected by the deceleration sensor 144 is compared with the target value $G_T$, in steps S132 and S133 which correspond to steps S3 and S4 of the first embodiment in which the absolute value of the detected deceleration value G is compared with the target value.

Described in detail, step S1' is substituted for step S1 in the flow chart of FIG. 3 of the first embodiment. In step S1', the vehicle speeds detected by the wheel speed sensors 126-132 are also read in order to determine the vehicle speed, so that step S131 is implemented to determine whether the vehicle speed is zero or not, that is, whether or not the vehicle is in the stop state. If the vehicle is running, a negative decision (NO) is obtained in step S131, and steps S132, S133, S5-S7 corresponding to steps S3-S7 of the first embodiment are implemented to determine the friction coefficient $\mu$ depending upon the detected actual deceleration value G as compared with the target value $G_T$.

If the vehicle speed is zero, an affirmative decision (YES) is obtained in step S131, and the control flow goes to step S134 in which the friction coefficient $\mu$ used in calculating the braking pressure P in step S9 is set to the standard value $\mu_B$. Step S134 is followed by steps S8 and S9. Therefore, when the vehicle is in the stop state, the braking pressures P are determined by the standard friction coefficient value $\mu_B$, and the target deceleration value $G_T$, as is apparent from the above equations (5)-(8). Accordingly, the braking pressures P to be applied to the wheel brake cylinders 26, 28, 42, 44 when the vehicle is stopped are determined according to the depression force of the brake pedal 10. If steps S131 and S134 were not provided, step S6 would be repeatedly implemented so as to increase the braking pressures P to an excessively high level, since the actual deceleration value G is zero and cannot be equal to 0.95% of the target value $G_T$.

It will be understood that steps S131 and S134 correspond to auxiliary control means which is operable only when the vehicle is in the stop state, and which functions to control the braking pressures applied to the wheel brake cylinders 26, 28, 42, 44 corresponds to the operating amount of the brake pedal 10.

Figure 8:
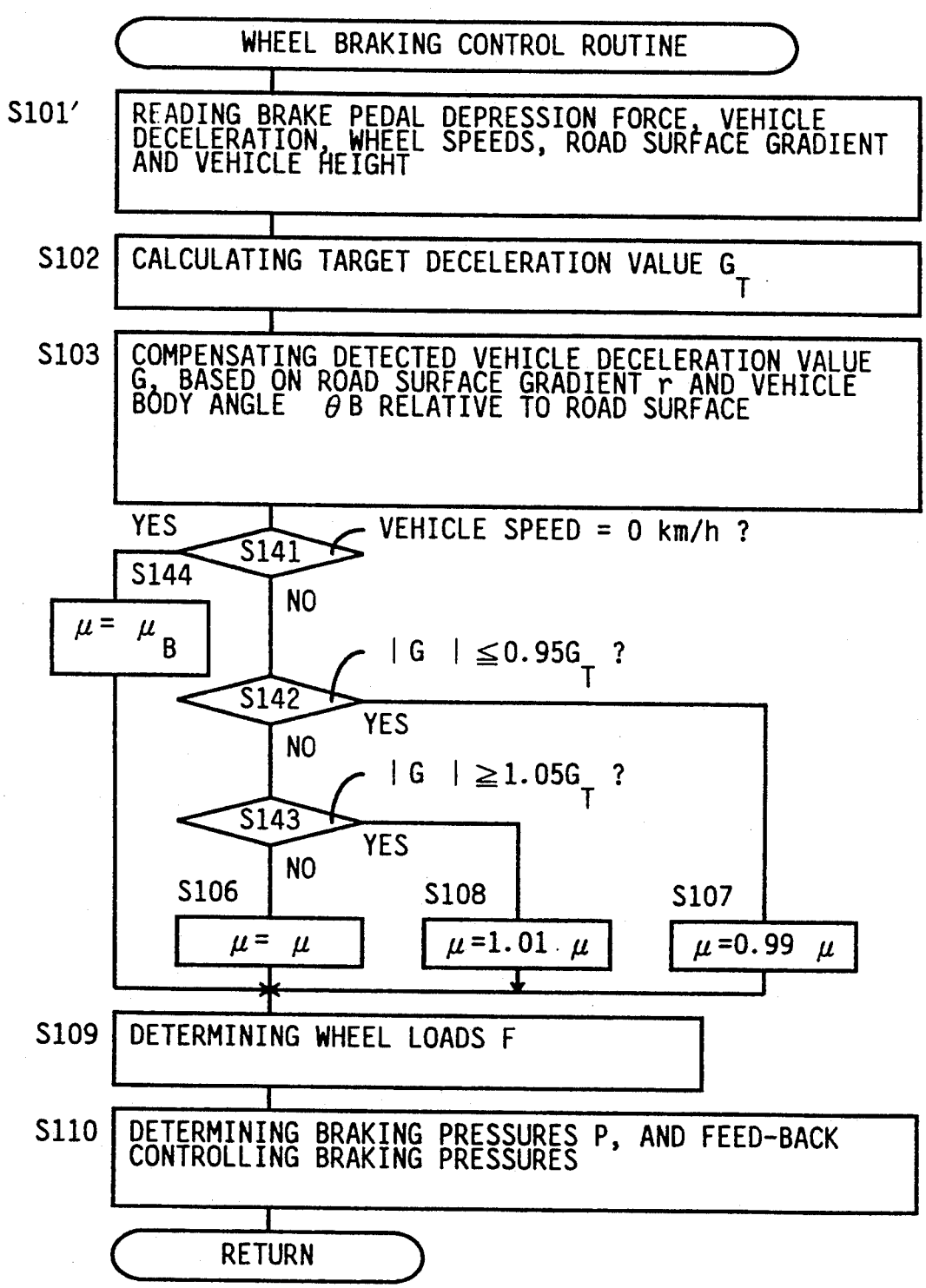
FIG. 8 is a flow chart illustrating a wheel braking control routine used in a still further embodiment of this invention.

Referring further to the flow chart of FIG. 8 showing another wheel braking control routine, there will be described a fourth embodiment of this invention, which is a modification of the second and third embodiments of FIGS. 5 and 7. In the routine of FIG. 8, step S101' and steps S141-S144 are identical with step S1' and steps S131-S134 of FIG. 7, respectively. Further, step S103 is implemented in the present fourth embodiment as in the second embodiment of FIG. 5, in order to compensate the detected actual deceleration value G, on the basis of the road surface gradient $\theta$ and the inclination angle $\theta B$ of the vehicle body relative to the road surface. The provision of steps S141 and S144 prevents controlling the braking pressures P depending upon the actual deceleration value G, and permits the braking pressures P to be controlled such that the braking force applied to the wheels corresponds to the operating amount of the brake pedal 10 while the vehicle is stopped.

While the present invention has been described in its presently preferred embodiments, it is to be understood that the invention is not limited to the details of the illustrated embodiments, but may be embodied with various changes, modifications and improvements, which may occur to those skilled in the art, in the light of the foregoing teachings.

In the third and fourth embodiments of FIGS. 7 and 8, the braking pressures P are determined on the basis of the target deceleration value $G_T$ (which is determined by the depression force acting on the brake pedal 10) and the wheel loads F, even when the vehicle is in the stop state. However, the braking pressures P, while the vehicle is in the stop state, may be determined more simply according to the operating amount (e.g., depression force or operating stroke) of the brake pedal 10.

Further, the third and fourth embodiments may be modified such that the absolute value of the detected actual deceleration value G is compared with the target value $G_T$ in steps S132, S133, S142 and S143, as in steps S3, S4, S104 and S105 of FIGS. 3 and 5 of the first and second embodiments.

While the brake system illustrated in FIG. 1 has a power-driven hydraulic pressure source (70, 80) whose pressure is electrically controlled by the pressure control valves 58-64, and a master cylinder 12 manually operated by the vehicle driver, the principle of the present invention is equally applicable to other types of an electrically controlled brake system, for example, a brake system not equipped with a master cylinder, or a brake system in which the friction members are forced against the rotors, by electrically operated actuators which are controlled according to the operating amount of a brake operating member such as the brake pedal 10.

What is claimed is:

1. An electrically controlled brake system for a wheel of a vehicle, comprising:
   a brake operating member;
   first detecting means for detecting an operating amount of said brake operating member;
   braking means for a one of reducing rotational speed and preventing rotation of said wheel to produce a braking effect;
   second detecting means for detecting an actual braking effect provided by said braking means, said second detecting means detecting said actual braking effect in the form of a positive value when said vehicle is running in one of a forward direction and a backward direction, and in the form of a negative value when said vehicle is running in the other of said forward and backward directions; and
   control means for determining a positive value as a target braking effect on the basis of said operating amount detected by said first detection means and controlling said braking means such that an absolute value of said actual braking effect detected by said second detecting means coincides with said positive value of said target braking effect to preclude an unnecessarily large braking force being applied to the wheel, irrespective of whether said vehicle is running in said forward or backward direction.

2. An electrically controlled brake system according to claim 1, further comprising auxiliary control means operable when said vehicle is in a stop state, said auxiliary control means inhibiting said control means and controlling said braking means such that an operating force of said braking means is directly taken from said operating amount of said brake operating member detected by said first detecting means to preclude an unnecessarily large braking force being applied to the wheel when said vehicle is in the stop state.

3. An electrically controlled brake system according to claim 1, wherein said second detecting means detects an actual deceleration value of said vehicle as said braking effect.

4. An electrically controlled brake system according to claim 1, wherein said control means controls said braking means such that an amount of braking of said wheel by said braking means remains unchanged when said actual braking effect is between a first predetermined value close to said target braking effect and a second predetermined value smaller than said first predetermined value, and such that said amount of braking of said wheel decreases when said actual braking effect is larger than said first predetermined value, while said amount of braking of said wheel increases when said actual braking effect is smaller than said second predetermined value.

5. An electrically controlled brake system according to claim 1, wherein said first detecting means detects as said operating amount of said braking operating member, an operating force which acts on said brake operating member, said control means comprising means for determining said target braking effect on the basis of said operating force detected by said first detecting means.

6. An electrically controlled brake system according to claim 1, wherein said braking means comprises:
   a hydraulic pressure source;
   a friction brake including a non-rotatable friction member, a brake rotor rotating with said wheel, and a hydraulically operated brake cylinder for forcing said friction member against said brake rotor; and
   a pressure control valve for reducing a hydraulic pressure of said hydraulic pressure source, and applying the reduced hydraulic pressure to said brake cylinder,
   and wherein said control means controls said pressure control valve.

7. An electrically controlled brake system according to claim 6, wherein said hydraulic pressure source includes a power source for producing the hydraulic pressure, said brake system further comprising:
   a master cylinder connected to said brake operating member and producing a hydraulic pressure according to an operation of said brake operating member;
   a brake simulator connected to said master cylinder and accommodating a pressurized fluid received from said master cylinder such that a pressure within said brake simulator increases with an increase in an amount of said pressurized fluid accommodated therein, so as to give an operator of said brake operating member a feeling as if said brake cylinder were operated by said pressurized fluid supplied from said master cylinder;

a first switch valve for fluid communication between said brake cylinder and said hydraulic pressure source through said pressure control valve when said hydraulic pressure source is normal, said first switch valve disconnecting said brake cylinder from said hydraulic pressure source and connecting said brake cylinder to said master cylinder when said hydraulic pressure source is defective; and a second switch valve for fluid communication between said master cylinder and said brake simulator when said hydraulic pressure source is normal, said second switch valve disconnecting said master cylinder from said brake simulator and connecting said master cylinder to said brake cylinder when said hydraulic pressure source is defective.

8. An electrically controlled brake system according to claim 6, wherein said control means controls said pressure control valve such that the hydraulic pressure applied to said brake cylinder increases by a predetermined amount at a predetermined time interval while said actual braking effect is smaller than said target braking effect.

9. An electrically controlled brake system according to claim 6, wherein said control means controls said pressure control valve so as to increase the hydraulic pressure applied to said brake cylinder, when said actual braking effect is smaller than said target braking effect, an amount of increase of said hydraulic pressure being determined by an amount of reduction of a coefficient of friction ($\mu$) between said friction member and said brake rotor of said braking means, assuming that said amount of reduction of the coefficient of friction would exist when said actual braking effect is smaller than said target braking effect.

10. An electrically controlled brake system according to claim 1, further comprising road gradient detecting means for detecting a gradient of a road surface on which the vehicle is running, and compensating means for compensating said actual braking effect detected by said second detecting means, on the basis of said gradient of the road surface detected by said road gradient detecting means.

11. An electrically controlled brake system for a wheel of a vehicle, comprising:

a brake operating member;

first detecting means for detecting an operating amount of said brake operating member;

braking means for a one of reducing rotational speed and preventing rotation of said wheel to produce a braking effect;

second detecting means for detecting an actual braking effect provided by said braking means;

primary control means for controlling said braking means such that said actual braking effect detected by said second detecting means coincides with a target braking effect determined on the basis of said operating amount of said brake of said brake operating member detected by said first detecting means; and auxiliary control means operable when said vehicle is in a stop state, said auxiliary control means inhibiting said primary control means and controlling said braking means such that an operating force of said braking means is directly taken from said operating amount of said brake operating member detected by said first detecting means to preclude an unnecessarily large braking force being applied to the wheel when said vehicle is in the stop state.

12. An electrically controlled brake system for a wheel of a vehicle, comprising:

a brake operating member;

first detecting means for detecting an operating amount of said brake operating member;

braking means for braking said wheel;

second detecting means for detecting an actual braking effect provided by said braking means, said second detecting means detecting said actual braking effect in the form of a positive value when said vehicle is running in one of a forward direction and a backward direction, and in the form of a negative value when said vehicle is running in the other and said forward and backward directions;

primary control means for determining a positive value as a target braking effect on the basis of said operating amount detected by said first detecting means, and controlling said braking means such that an absolute value of said actual braking effect detected by said second detecting means coincides with said positive value of said target braking effect; and auxiliary control means for inhibiting said primary control means for controlling said braking means based on said actual braking effect when said vehicle is in a stop state.

13. An electrically controlled brake system according to claim 12, wherein said auxiliary control means controls said braking means such that an operating force of said braking means corresponds to said operating amount of said brake operating member detected by said first detecting means.

14. An electrically controlled brake system according to claim 12, wherein said primary control means changes an operating force of said braking means on the basis of a difference between said actual braking effect detected by said second detecting means and said target braking effect determined on the basis of said operating amount of said brake operating member detected by said second detecting means.

15. An electrically controlled brake system according to claim 14, wherein said braking means comprises a friction member, a brake rotor rotating with said wheel, and means for forcing said friction member against said brake rotor, and said primary control means calculates as said operating force of said braking means a force to be applied to said friction member, according to an equation which includes as a parameter a coefficient of friction between said friction member and said brake rotor of said braking means.

* * * * *